United States Patent [19]

Müller

[11] 4,323,725
[45] Apr. 6, 1982

[54] STRAIN RELIEF DEVICE FOR AN ELECTRICAL SUPPLY LINE

[75] Inventor: Thomas Müller, Stuttgart, Fed. Rep. of Germany

[73] Assignee: Robert Bosch GmbH, Stuttgart, Fed. Rep. of Germany

[21] Appl. No.: 151,103

[22] Filed: May 19, 1980

[30] Foreign Application Priority Data

Jul. 18, 1979 [DE] Fed. Rep. of Germany ....... 2928931

[51] Int. Cl.³ ..................... H01R 13/585; H02G 3/18
[52] U.S. Cl. ............................... 174/65 R; 24/134 R; 24/134 L; 174/135; 339/103 R
[58] Field of Search ............... 174/46, 65 R, 135, 168; 339/58, 103 R, 103 C, 105, 107; 24/134 R, 134 KA, 134 KB, 134 L, 134 N, 134 P

[56] References Cited

U.S. PATENT DOCUMENTS

| 849,896 | 4/1907 | Griffith | 174/168 X |
| 1,828,801 | 10/1931 | Finlayson | 24/134 R |
| 2,193,383 | 3/1940 | Salzer | 24/134 R |
| 3,546,502 | 12/1970 | Botefuhr et al. | 310/50 |

FOREIGN PATENT DOCUMENTS 2550939 5/1977 Fed. Rep. of Germany ...... 174/135
138392 10/1979 German Democratic Rep. ................. 339/103 R Primary Examiner—Laramie E. Askin
Attorney, Agent, or Firm—Michael J. Striker

[57] ABSTRACT

A strain relief device, especially for power tools, has a pin upon which is pivotally mounted a clamping member with a spirally curved rough clamping surface which coacts with a second clamping surface. An electrical line is inserted between these surfaces and the clamping member is swung thereby applying a clamping force to the electrical line. When strains are applied to the line, the clamping member provides an increased clamping force by swiveling so that a section of the member of larger diameter presses the line against the second clamping surface. A lock mechanism is also provided to prevent the electrical line from being pushed further into the housing.

13 Claims, 7 Drawing Figures

STRAIN RELIEF DEVICE FOR AN ELECTRICAL SUPPLY LINE

BACKGROUND OF THE INVENTION

The invention relates to a strain relief device which protects the user of electrical power tools, or other electrical devices, by protecting the electrical supply line from straining forces which may act upon the line where it enters the electrical device.

Such devices are well known in the art, but the previously known devices have disadvantages. One such device is described in U.S. Pat. No. 3,546,502. This device has a clamping ring secured around the electrical supply cord by two screws. The screws press the ring against the electrical line forcing it into a depression in the tool or appliance housing. This device is disadvantageous since the electrical line must be secured after it is placed near the depression to permit the clamping ring to be placed over the connection and then screwed tightly to permanently attach the ring. This process is undesirably time consuming, even if a mounting device is used to assist the installation. An additional disadvantage is the failure due to permanent deformation of the above-described device over a length of time, i.e. the device eventually plastically deforms the electrical line and thus no longer adequately secures the line.

Another well known device, described in U.S. Pat. No. DE. 1,285,588, has a sleeve with a conical hole inside of which is placed a frustoconical clamping body capable of longitudinal movement and a coiled spring that pushes the clamping body toward the narrower end of the hole. The electrical line is attached using a special tool to press the clamping body against the spring. The line is then inserted into the gap formed between the tool housing and the clamping body. When the line is placed under a strain, both the line and the clamping body move toward the narrower end of the hole until they become wedged. The originally round cross-section of the electrical line becomes deformed thereby to a kidney-shaped cross-section due to the contact of the clamping body with the line. A disadvantage of this device is that it permits the line to be damaged by strain forces that are of high magnitude and long duration. Another disadvantage is that the device eliminates only one degree of freedom of the line's motion, i.e. longitudinal motion out of the housing. If instead of a strain force, the line is subjected to a pushing force the line is free to move into the housing. Yet another disadvantage of this device is the impossibility of inserting cable ends provided with connecting lugs or terminals into the housing in the direction counter to the spring force.

SUMMARY OF THE INVENTION

It is an objective of the invention to overcome the above-stated disadvantages of the prior art.

According to the invention this is accomplished by attaching a pivoting clamping member to the tool housing. This member has a rough clamping surface which acts to press the supply line against another clamping surface, preferably formed as part of the housing, in response to a strain on the supply line. To facilitate this action the clamping surfaces are rough or ridged.

Another aspect of the invention is a locking mechanism formed by two sets of teeth. One set is arranged on the tool housing concentric with respect to the pivot axis. The other set is attached to the clamping member and arranged so that the second set may move to increase the clamping force in response to greater strains, but is incapable of moving in the opposite direction in response to pushing forces.

Yet another aspect of the invention consists of forming the claming surface to resemble part of a spiral.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
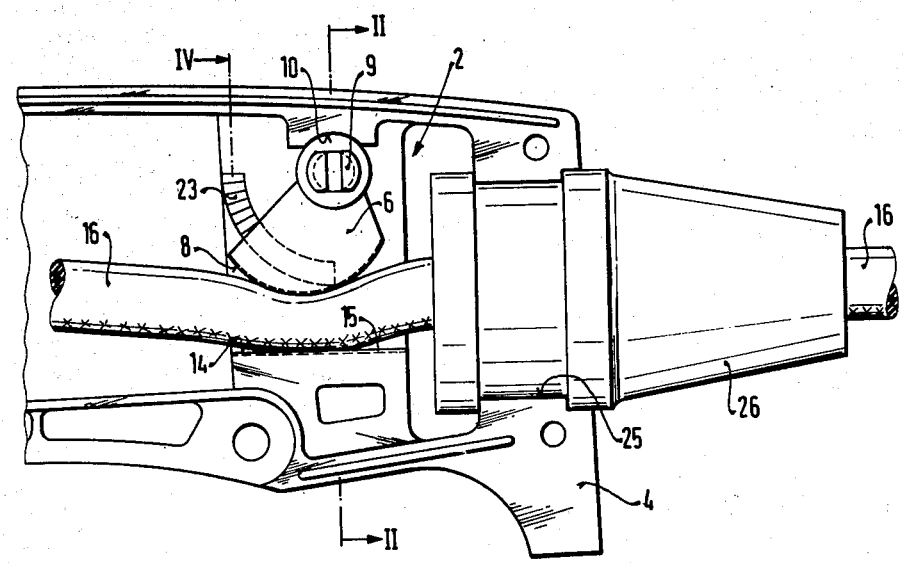
FIG. 1 is a cut-away side view of the invention.
Figure 2:
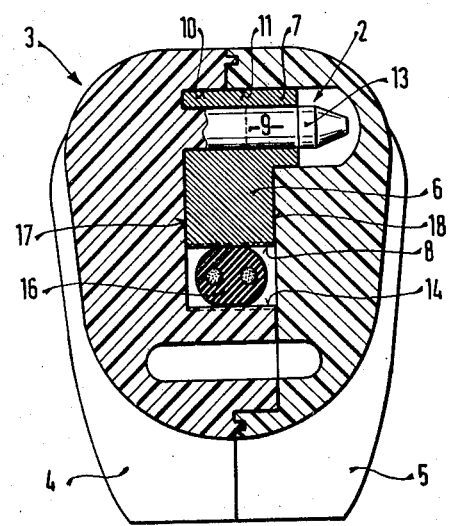
FIG. 2 is a cross section of the device shown in FIG. 1, taken on line II—II.
Figure 5:
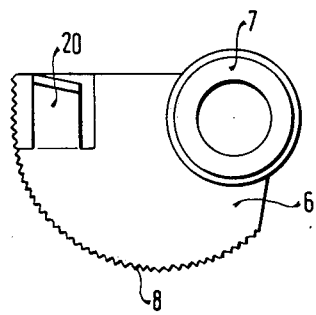
FIG. 5 is a side view of a part of FIG. 1.

The strain relief device 2, as shown in FIG. 1, is located in the hand grip 3, illustrated in FIG. 2, of an electrical power tool. The hand grip 3 is composed of two halves or sections 4, 5 which also act as positioning members for the strain relief device 2. Between the halves 4, 5 is mounted a swingable clamping member 6. The clamping member 6 has a positioning eye 7 and a clamping surface 8 as may be seen in FIG. 5. The clamping surface 8 is curved and may be formed as an archimedean spiral, as a spiral of constant curvature, or as an approximation to a spiral. In any of these forms the clamping surface 8 should be rough, preferably with ridges. Referring once more to FIG. 1, a pin 9 is attached to the section 4 of hand grip 3 and the section is formed with a shoulder 10 surrounding the pin 9. Pin 9 is inserted through positioning eye 7 of clamping member 6 so that shoulder 10 forms an abutment for the clamping member 6. The curvature of shoulder 10 is so matched to the outer diameter of the eye 7 that the shoulder 10 will act as a firm abutment for the member 6, even in the event of an elastic deformation of pin 9. Similarly, the section 5 also has a shoulder 11 which is formed and functions in the same manner as shoulder 10.

Figure 3:
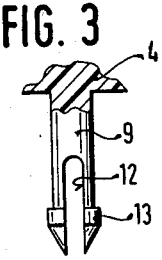
FIG. 3 is a top view of a detail of FIG. 2.
Figure 4:
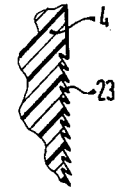
FIG. 4 is a cross-sectional detail view of FIG. 1, taken on line IV—IV.
Figure 6:
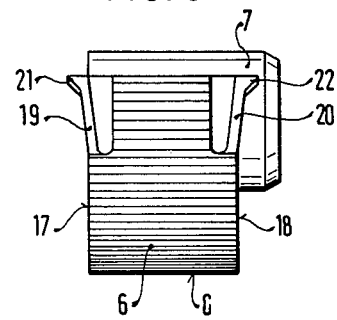
FIG. 6 is a front view of the part shown in FIG. 5.
Figure 7:
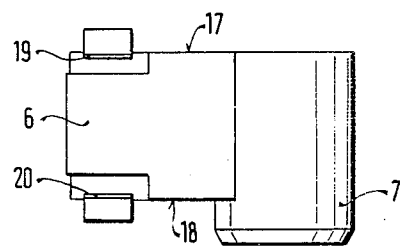
FIG. 7 is a top view of the part shown in FIG. 5.

In FIG. 3 pin 9 has at its free end a slit 12 that divides the pin 9 into two parts. At the end of each part is a nose 13 that projects outward from the center of the pin 9. The positioning eye 7 is arranged upon pin 9 by forcing the noses 13 elastically together. As the positioning eye is further moved along the pin 9, the noses 13 spring back so as to secure the clamping member 6 on section 4 of the hand grip 3. As is shown in FIG. 2 the section 4 also possesses a clamping surface 14 located opposite clamping surface 8 so that the electrical line 16 is pressed between the two clamping surfaces. Clamping surface 14 is provided with teeth. These teeth act to lock the line 16 when coacting with clamping surface 8. Flexible tongues 19, 20 are formed on the sides 17, 18 of clamping member 6 as shown in FIG. 6. These tongues 19, 20 have teeth 21, 22 which act as catches. The catches adjoin a locking mechanism that is arranged on the halves 4, 5 concentric with respect to pin 9. As can be seen in FIG. 1 and FIG. 4 this locking mechanism has teeth 23 which coact with tooth 21. These teeth 23 are provided on the sections 4, 5 and located on arcs concentric to the axis of the pin 9 (see FIG. 1). The teeth 21, 22 and locking teethJ■ 23 are positioned in such a way that the clamping member 6 can swivel in the direction towards the line inlet opening 25 which is provided in hand grip 3 for insertion of the line 16, but is locked against movement in the opposite direction.

The assembly of the strain relief device is accomplished, first, by pushing clamping member 6 onto pin 9, as already described. The clamping member 6 is so positioned that as large as possible a space remains between the surfaces 8 and 14. The electrical line 16 is then placed between the clamping surfaces 8, 14, and through socket 26. Then the clamping member 6 is swung toward socket 26 until the electrical line 16 is lodged between clamping surface 8 and clamping surface 14 of section 4. Section 5 of hand grip 3 is then joined with section 4 so that shoulder 11 of section 5 abuts the positioning eye 7 of clamping member 6.

If a strain is placed on the electrical cord outside of the hand grip 3, the clamping member 6 is further turned due to the dragging action of line 16 upon clamping surface 8, thereby increasing the pressure applied upon the electrical line by clamping surface 14. Thereby the teeth 21, 22 are free to slide over teeth 23. The teeth 21, 22 assure that a pushing force acting on the electrical line 16 projecting from the hand grip 3 can not cause a rejection of the clamping force, although a strain (i.e. pulling force) can produce whatever intensity of clamping force is needed. The device is also capable of providing additional clamping force over a long period of time during which, through aging of the line 16, the clamping force on the electrical line 16 may decrease to a low level simply by additional pull upon the line 16. The tips 15 of the scale-like clamping surface 14 also work to hinder the motion of electrical line 16 when either the line or the power tool becomes subjected to a pushing force. The tips 15 provide additional safety if e.g. a strain force causes the teeth 21, 22 to move only a small distance over teeth 23, e.g. about a half of a tooth distance.

Additionally it should be noted that clamping member 6 need not be arranged inside of hand grip 3. It can also be supported in a swingably mounted manner between housing parts of the power tool (not shown).

It will be understood that each of the elements described above, or two or more together, may also find a useful application in other types of strain relief devices differing from the types described above.

While the invention has been illustrated and described as embodied in a power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A strain relief device for an electrical supply line in an electrical instrument, particularly a power tool, which has a housing and an opening in the housing to admit the supply line, comprising a clamping member mounted for pivoting about a pivot axis relative to said housing and having a first clamping surface and a pivoting eye; a second clamping surface on said housing, wherein the supply line is adapted to be located between said first and second clamping surfaces, said clamping member being operative to apply a clamping force to said supply line when a strain force is applied to said supply line in the direction outwardly of the housing; and a locking mechanism operative to prevent motion of said supply line in response to a pushing force applied thereto in the direction inwardly of said housing, said locking mechanism comprising first teeth arranged on said housing so as to form a part of the same and located concentrically relative to said pivot axis of said clamping member, and at least one second teeth attached to said clamping member and engageable with said first teeth.

2. A strain relief device as defined in claim 1, wherein said housing has two halves connectable with one another, each of said halves of said housing being provided with such first teeth so that said second teeth of said clamping member are simultaneously engageable with the first teeth of one of said halves and the first teeth of the other of said halves of said housing.

3. A strain relief device as defined in claim 1, wherein said first clamping surface is curved in conformity with a part of a spiral.

4. A strain relief device as defined claim 1, wherein said first clamping surface is rough.

5. A strain relief device as defined in claim 1, wherein said second clamping surface is rough.

6. A strain relief device as defined in claim 1, further comprising a pin operative for pivotally mounting said clamping member to said housing.

7. A strain relief device as defined in claim 1, wherein said second clamping surface has teeth-like projections directed so that they oppose strain forces on said supply line.

8. A strain relief device for an electrical supply line in an electrical instrument, particularly a power tool, which has a housing and an opening in the housing to admit the supply line, comprising a clamping member pivotally mounted to said housing and having a first clamping surface and a pivoting eye; a second clamping surface on said housing, wherein the supply line is adapted to be located between said first and second clamping surfaces, said clamping member being operative to apply a clamping force to said supply line when a strain force is applied to said supply line in the direction outwardly of the housing; and a locking mechanism operative to prevent motion of said supply line in response to a pushing force applied thereto in the direction inwardly of said housing; and a pin having an axis and detachably mounting said clamping member for pivoting relative to said housing so that said clamping member can be mounted on said housing by fitting onto said pin in one axial direction and fixing on said pin, and dismounted from said housing by releasing and removing said clamping member from said pin in another axial direction opposite to said one axial direction.

9. A strain relief device as defined in claim 8, wherein said locking mechanism comprises first teeth arranged concentric with respect to the pivoting axis; and at least one second tooth attached to said clamping member, and operative for engaging said first teeth.

10. A strain relief device as defined in claim 9, wherein said first teeth are part of the housing.

11. A strain relief device as defined in claim 8, wherein said pin has a free end that is slit to form two sections, each section having a projection directed away from the longitudinal axis of the pin.

12. A strain relief device as defined in claim 11, wherein said housing further comprises two halves having a first shoulder and a second shoulder concentric to said pin, both the first shoulder and the second shoulder adjoining said pivoting eye of said clamping member.

13. A strain relief device as defined in claim 8, wherein said housing has two halves connectable with one another, said pin being provided on one of said halves of said housing so that said clamping member can be mounted on said one half of said housing prior to connecting said halves of said housing with one another.

* * * * *